United States Patent [19]

Teranishi et al.

[11] Patent Number: 4,549,233
[45] Date of Patent: Oct. 22, 1985

[54] POSITION CONTROL SYSTEM

[75] Inventors: Hiroshi Teranishi, Nagareyama; Takashi Nakatsuyama, Sakura; Masaomi Inagaki, Tokyo, all of Japan

[73] Assignee: Sony Corporation, Tokyo, Japan

[21] Appl. No.: 507,068

[22] Filed: Jun. 23, 1983

[30] Foreign Application Priority Data

Jun. 30, 1982 [JP] Japan ............................. 57-111664

[51] Int. Cl.[4] .................... G11B 15/18; G11B 19/02; H02P 7/60; H02P 1/22
[52] U.S. Cl. ........................................ 360/90; 360/61; 360/62; 360/74.1; 360/137; 318/54; 318/256; 318/265
[58] Field of Search ............... 318/53, 54, 65, 256, 318/264, 265, 280, 696; 360/90, 93, 105, 61, 62, 71, 74.1, 137

[56] References Cited

U.S. PATENT DOCUMENTS

| | | | |
|---|---|---|---|
| 3,891,911 | 6/1975 | Frentress | 318/696 |
| 4,272,792 | 6/1981 | Nakamichi et al. | 360/69 |
| 4,348,701 | 9/1982 | Kanayama et al. | 360/61 |
| 4,390,918 | 6/1983 | Matsumoto | 360/137 |
| 4,422,107 | 12/1983 | Motoyama | 360/62 |

FOREIGN PATENT DOCUMENTS

| | | | |
|---|---|---|---|
| 53-120120 | 10/1978 | Japan | 318/280 |
| SU720527 | 3/1980 | U.S.S.R. | 360/74.1 |

Primary Examiner—John H. Wolff
Assistant Examiner—Benjamin Urcia
Attorney, Agent, or Firm—Lewis H. Eslinger; Alvin Sinderbrand

[57] ABSTRACT

A position control system for controlling a motor-driven mechanism capable of occupying a plurality of specified positions comprises a plurality of switches for specifying a position to be occupied by the mechanism and an encoder for generating a specified position signal representative of the specified position and a loading circuit for providing a present position signal representative of the position presently occupied by the mechanism. A read-only memory circuit uses the specified and present position signals to provide a control signal for controlling the motor to move the mechanism to a particular position and a comparison signal and a particular position signal indicative of that particular position. A position detector responsive to the position of the mechanism provides a detection signal representative of the particular position when the mechanism reaches it. A comparator compares the comparison signal from the memory circuit with the detection signal and provides a match signal to the loading circuit when they coincide. In response to the match signal the loading circuit loads the particular position signal into the memory circuit as the present position signal. If the particular position signal matches the specified position signal, the memory circuit provides a control signal that stops the motor. If the particular position does not match the specified position signal, the memory circuit provides a control signal to actuate the motor again. The illustrated embodiment of the system provides a tape recording and reproducing apparatus with four different operating modes.

20 Claims, 8 Drawing Figures

| MODE | D1(D2,D5) | | | |
|------|---|---|---|---|
| PB   | 1 | 0 | 0 | 4 |
| REC  | 0 | 1 | 1 | 3 |
| FF   | 0 | 1 | 0 | 2 |
| REW  | 0 | 0 | 1 | 1 |
| STOP | 0 | 0 | 0 | 0 |

FIG. 4

| D3 | M1F | M1R | M2F | M2R | MOTOR-DIRECTION OF ROTATION |
|----|-----|-----|-----|-----|-----------------------------|
| 8  | 1   | 0   | 0   | 0   | M1 - FORWARD |
| 4  | 0   | 1   | 0   | 0   | M1 - REVERSE |
| 2  | 0   | 0   | 1   | 0   | M2 - FORWARD |
| 1  | 0   | 0   | 0   | 1   | M2 - REVERSE |
| 0  | 0   | 0   | 0   | 0   | M1 & M2 - STOPPED |

| D5 | A | B | C | D | MODE |
|---|---|---|---|---|---|
| 8 | 1 | 0 | 0 | 0 | PB |
| 4 | 0 | 1 | 0 | 0 | REC |
| 2 | 0 | 0 | 1 | 0 | FF |
| 1 | 0 | 0 | 0 | 1 | REW |
| 0 | 0 | 0 | 0 | 0 | STOP |

FIG. 7

| D1 / D2 | (STOP) 0 | | | (REW) 1 | | | (FF) 2 | | | (REC) 3 | | | (PB) 4 | | |
|---|---|---|---|---|---|---|---|---|---|---|---|---|---|---|---|
| | D3 | D4 | D5 | D3 | D4 | D5 | D3 | D4 | D5 | D3 | D4 | D5 | D3 | D4 | D5 |
| 0 (STOP) | 0 | F | 0 | 1 | 1 | 1 | 2 | 2 | 2 | 4 | 4 | 3 | 8 | 8 | 4 |
| 1 (REW)  | 2 | 0 | 0 | 0 | F | 1 | 2 | 2 | 2 | 4 | 2 | 0 | 2 | 0 | 0 |
| 2 (FF)   | 1 | 0 | 0 | 1 | 1 | 0 | 2 | F | 2 | 2 | 2 | 0 | 1 | 0 | 0 |
| 3 (REC)  | 8 | 0 | 0 | 8 | 0 | 0 | 0 | 8 | 0 | 0 | 0 | F | 0 | 8 | 8 |
| 4 (PB)   | 4 | 0 | 0 | 4 | 0 | 0 | 4 | 0 | 0 | 4 | 4 | 3 | 0 | F | 4 |

POSITION CONTROL SYSTEM

BACKGROUND OF THE INVENTION

1. Field of the Invention

This invention relates to a position control system and, more particularly, to a position control system for controlling a mechanism capable of being placed by a drive means in any one of a plurality of specified positions.

1. Description of the Prior Art

Position control systems for controlling the position of motor-driven mechanisms are known in the prior art. More complex systems have often included microcomputers. The microcomputers that have been used in the prior art incorporate one or more random access memories, a calculation circuit, a data transfer circuit and, often, other elements. Furthermore, microcomputers are usually made for more than one application, which makes them expensive, and are not small enough or are not designed to operate at very low voltages, which makes them unsuitable for use with portable tape recorders.

OBJECTS AND SUMMARY OF THE INVENTION

Accordingly, it is an object of the present invention to provide an improved position control system that overcomes the aforementioned defects in prior art position control systems.

It is another object of the present invention to provide a position control system which is capable of controlling a motor-driven mode changing mechanism of a tape recording and reproducing apparatus.

In accordance with an aspect of the present invention, a position control system for a mechanism capable of being placed by a drive means in any one of a plurality of specified positions comprises specifying means for providing a specified position signal having a value representative of a specified position to be occupied by the mechanism, loading means for providing a present position signal having value representative of the position presently occupied by the mechanism, memory means for receiving the specified and present position signals and generating in response thereto a control signal for controlling the drive means for moving the mechanism into a particular position and comparison and particular position signals having respective values representative of that particular position, a position detector for providing a detection signal having a predetermined value when the mechanism is in that particular position, and comparing means for providing a match signal to the loading means when the values of the detection and the comparison signals have a predetermined relation. In response to the match signal the loading means provides the particular position signal to the memory means as the present position signal and, when the values of the present position and specified position signals have a predetermined relation, the control signal de-energizes the drive means.

The above and other objects, features and advantages of the present invention will become apparent from the following description of an illustrative embodiment considered with the accompanying drawings.

DETAILED DESCRIPTION OF AN ILLUSTRATIVE EMBODIMENT

Figure 1A:
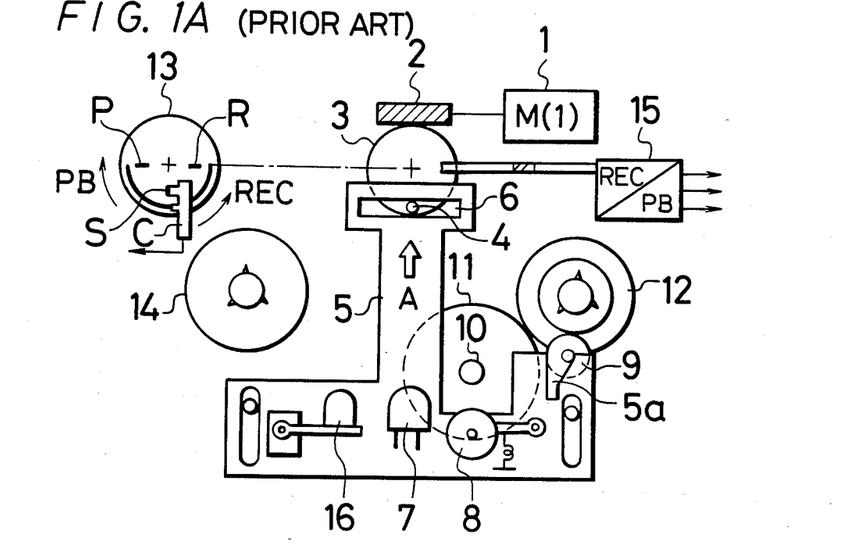
FIGS. 1A and 1B are schematic diagrams showing a prior art mode-changing mechanism of a tape recording and reproducing apparatus with which the position control system of the present invention can advantageously be used.
Figure 1B:
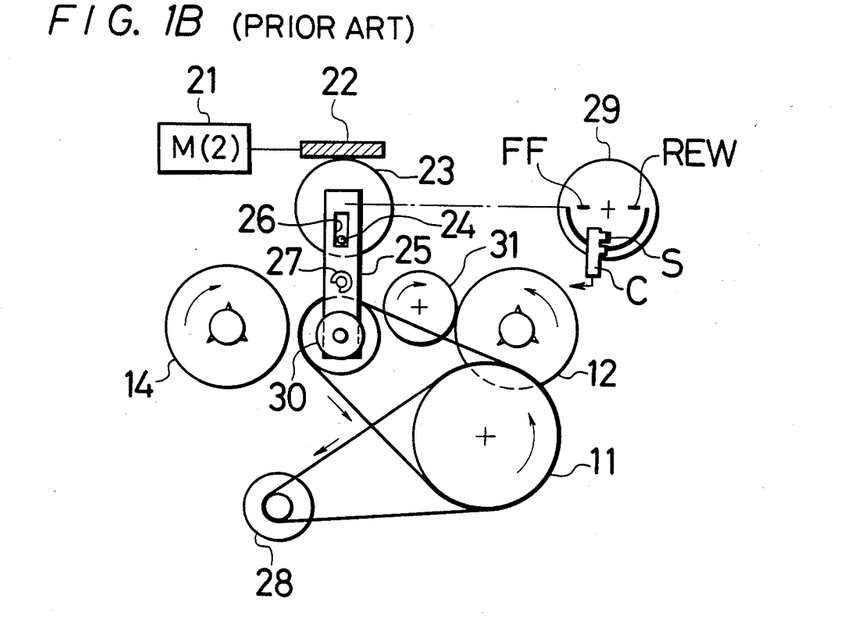

FIGS. 1A and 1B together schematically depict a known mode changing mechanism for a tape recording and reproducing apparatus, referred to herein as a "tape recorder" for the sake of brevity. FIG. 1A shows a first mode changing means for placing the tape recorder in the reproducing or playback (PB) mode and the record (REC) mode, while FIG. 1B shows a second mode changing means for placing the tape recorder in the fast forward (FF) mode and the rewind (REW) mode.

As shown in FIG. 1A, a first motor 1 rotates a worm gear 2 which in turn rotates a worm wheel 3. A pin 4 mounted on the worm wheel 3 protrudes into an elongated slot 6 in a movable base member 5. Thus, when the worm wheel 3 is rotated clockwise or counterclockwise from the neutral position shown in FIG. 1A, the base member 5 is moved upward in the direction of the arrow A.

The base member 5 carries a magnetic record/-playback head 7, a pinch roller 8 and an erase head 16. Accordingly, when the base 5 is displaced upward, the magnetic head 7 contacts a magnetic tape (not shown) and the pinch roller 8 pinches the magnetic tape against a continuously-driven capstan 10. Upward movement of the base 5 also displaces an idler 9 as a result of a camming groove 5a formed in the base 5. The idler 9 moves into contact with a flywheel 11 on the capstan 10 and with a take-up reel 12. The pinch roller 8 and the capstan 10 thus draw the magnetic tape from a supply reel 14 and the magnetic tape is wound around the rotating take-up reel 12.

Rotation of the motor 1 in a forward direction from the neutral position shown in FIG. 1A establishes the PB mode of the tape recorder, in which the erase head 16 is kept out of contact with the tape, for reproducing the signals recorded on the tape. A first indicating contact P on a contact member 13, which is ganged with the worm wheel 3, creates an electrical circuit through a stationary contact C when the first motor 1 has reached a forward angular position which is sufficient to establish the PB mode of the tape recorder.

To place the tape recorder in the REC mode, the motor 1 rotates in the reverse direction, which displaces the movable base 5 upward as described before. When the worm wheel 3 has rotated a predetermined amount, the pin 4 actuates a record/playback change-over switch 15 and a mechanism (not shown) moves the erase head 16 into contact with the magnetic tape. The take-up reel 12 is rotated as before by the capstan flywheel 11 through the idler 9. The contact member 13 creates an electrical circuit through a second indicating control REC and the stationary contact C to stop the reverse rotation of the motor 1 when it has reached a reverse angular position which is sufficient to place the tape recorder in the REC mode.

The contact member 13 also includes a STOP contact S that makes an electrical circuit with the stationary contact C when the motor 1 is in the neutral position, which corresponds to the non-operative position of the mode changing means. FIG. 1A shows the first mode changing means in the non-operative position.

FIG. 1B shows the second mode changing means, which employs a second motor 21 to set the operation of the tape recorder in either the FF mode or the REW mode. In the same way as described above regarding FIG. 1A, when the motor 21 rotates, a worm gear 22 and a worm wheel 23 rotate. A pin 24 on the worm wheel 23 is displaced either to the right or left within an elongated slot 26 formed through one end of a lever 25. The lever 25 is pivoted on the tape recorder chassis (not shown) by a pin 27. A rubber roller 30 pivoted at the other end of the lever 25 contacts the supply reel 14 to establish the REW mode or the take-up reel 12, through an idler 31, to establish the FF mode.

The rubber roller 30 is coupled with a drive motor 28 through the capstan flywheel 11 and a plurality of rubber belts. Accordingly, when the second motor 21 rotates in one direction, the rubber roller 30 contacts the supply reel 14 and the recorder's REW mode, in which the supply reel 14 rotates as shown by the arrow at a relatively increased rate, is established. When the motor 21 rotates in the other direction, the rubber roller 30 contacts the idler 31 and the recorder's FF mode, in which the take-up reel 12 rotates as shown by the arrow at a relatively increased rate, is established.

A contact member 29 has electrical contacts FF, REW and S, thereon. The contact member 29 rotates with the motor 21 to limit the angular extent of the motor's movement from the neutral position shown in FIG. 1B. That is, a stationary contact C creates an electrical circuit through a first indicating contact FF to provide for rotation of the motor 21 to a forward angular position, but only to the extent required for establishing the FF mode of operation. A second indicating contact REW establishes the REW mode in a similar manner by limiting the rotation of the motor 21 to a reverse angular position. The STOP contact S establishes the neutral position of the motor 21 and thus the non-operative position of the second mode changing means.

With the mode changing mechanism described above, switching the tape recorder to various operating modes from its non-operative or STOP mode is relatively easy. The proper motor is actuated and the contact member 13 or 29 limits the motor's rotation. However, when the tape recorder is to be changed from, for example, the PB mode to the FF mode, first the first motor 1 has to be actuated in the proper direction to put the first mode changing means in its non-operative position and then the second motor 21 has to be actuated in the proper direction to put the second mode changing means in the FF mode. Furthermore, it may be desired to prevent switching between particular modes, for example, from the REC mode directly to the PB mode. Control circuits capable of carrying out those or other desired mode-changing operations can become quite complicated. While the use of microcomputers or other types of CPU's (central processing units) have been proposed for such control systems, those devices usually include at least a read-and-write memory circuit or a RAM (random-access memory), a calculation circuit, a data transfer circuit and perhaps other elements to make it useful for general-purpose tasks. As a result, they can become quite expensive. And because such microcomputers are often large and cannot operate at low voltages, a position control system using a microcomputer is not suitable for use with a mode changing mechanism in portable tape recorders, which must be small and use little power.

Figure 2:
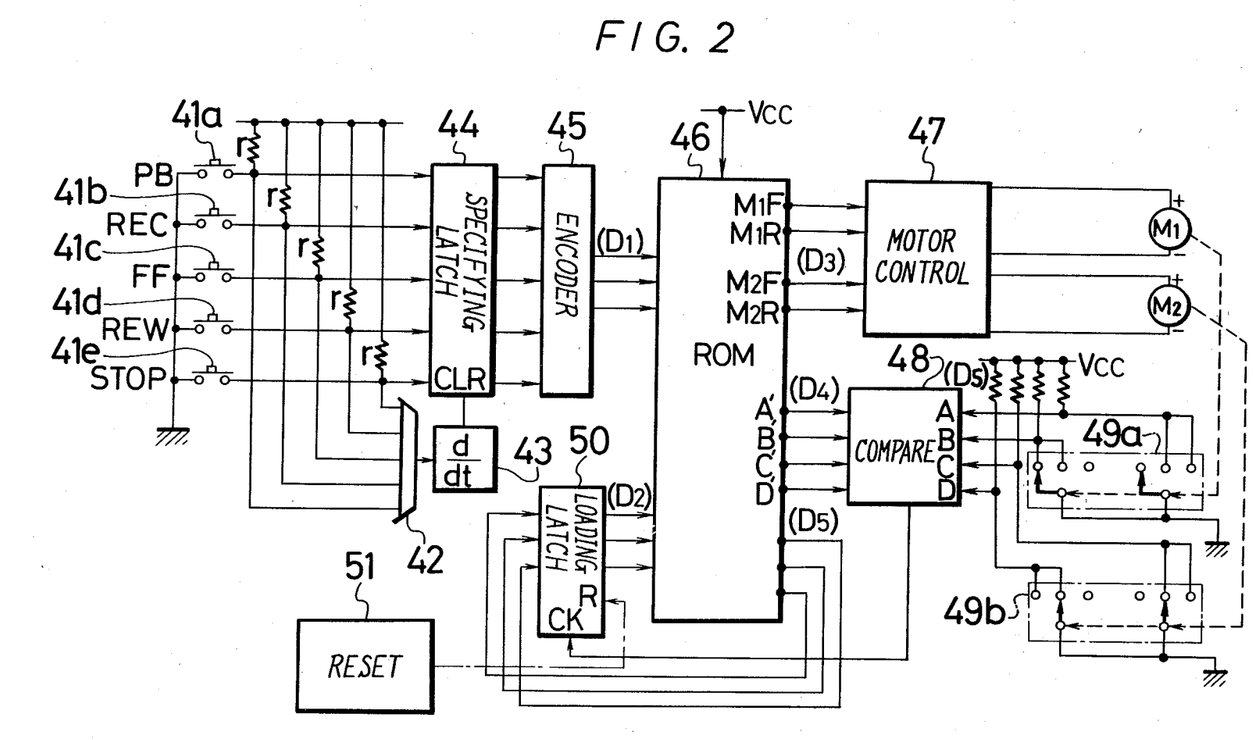
FIG. 2 is a schematic block diagram showing one embodiment of a position control system according to the present invention and suitable for use with a mode changing mechanism like that shown in FIGS. 1A and 1B.

FIG. 2 is a schematic block diagram showing an embodiment of a position control system according to the present invention which overcomes those disadvantages. FIG. 2 shows a specifying means used to specify the desired mode of operation of the tape recorder having the mode changing mechanism shown in FIGS. 1A and 1B. The specifying means comprises mode setting buttons or switches 41a to 41e, an OR circuit 42, a differentiating circuit 43 for detecting a falling pulse or digital "0" and a specifying latch circuit 44 for latching therein the signal resulting from depressing any of the mode setting buttons 41a to 41e. The latch circuit 44 establishes a sequential order priority for the buttons 41a to 41e. That is, if more than one of the mode setting buttons 41a to 41e are depressed at a time, the specifying latch circuit 44 holds therein a pre-selected one of those signals. The particular signal held is determined by a predetermined priority established in the latch circuit 44. The specifying means also includes an encoder 45 for providing a specified mode signal in response to the output from the specifying latch circuit 44. In the present embodiment a digital specified mode signal $D_1$ has the values shown in FIG. 3 for the various modes of operation. Each value of the specified mode signal $D_1$ corresponds to a different position of the mode changing means shown in FIGS. 1A and 1B, and in that sense the specified mode signal can also be considered a specified position signal.

A memory means 46 comprising a read-only memory (ROM) receives the specified mode signal $D_1$ and a present mode signal $D_2$ provided by a loading latch circuit 50, which will be described later, as the ROM address signals. In response to the address signals, the memory means 46 generates a four-bit digital control signal $D_3$ for controlling a motor control circuit 47 for first and second motors $M_1$ and $M_2$, a four-bit digital comparison signal $D_4$ and a three-bit digital particular mode signal $D_5$. The control signal $D_3$ selectively energizes the motors $M_1$ and $M_2$ to place the respective mode changing means in a particular position in accordance with the programming of the ROM 46. The comparison signal $D_4$ and the particular mode signal $D_5$ correspond to that particular position in a manner described in detail below. Again, the particular mode signal can also be considered a particular position signal since each mode of the tape recorder corresponds to a different position of the mode changing mechanism.

Figure 4:
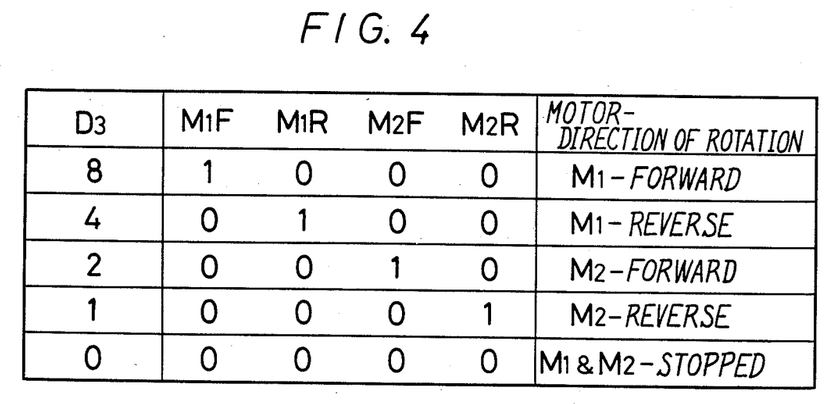

The motor control circuit 47 controls the rotation of the motors $M_1$ and $M_2$ in the forward and reverse directions from their neutral positions, as described in connection with the motors 1 and 21 shown in FIGS. 1A and 1B, in response to the control signal $D_3$. The control signal $D_3$ consists of the digital bits $M_1F$, $M_1R$, $M_2F$ and $M_2R$ generated by the ROM 46. As shown in FIG. 4, when the control signal $D_3$ is 8 (1000 in digital form), the motor $M_1$ is rotated in the forward direction; when $D_3$ is 4 (0100), the motor $M_1$ is rotated in the reverse direction. When the control signal $D_3$ is 2, (0010), the motor $M_2$ is rotated in the forward direction; when $D_3$ is 1 (0001), the motor $M_2$ is rotated in the reverse direction. When $D_3$ is 0, both motors $M_1$ and $M_2$ are stopped.

A comparator 48 compares the comparison signal $D_4$ generated by the memory circuit 46 with a detection signal $D_S$. The detection signal $D_S$ is generated by a position detector comprising a pair of position detecting switches 49a and 49b, which detect the arrival at their operating positions of the first and second mode changing means, respectively. The detection signal $D_S$ consists of the digital bits A, B, C and D generated by the detecting switches 49a and 49b. Because the value of $D_S$ is representative of the position of the mode changing mechanism, it also indicates the operating mode of the tape recorder.

Figure 5:
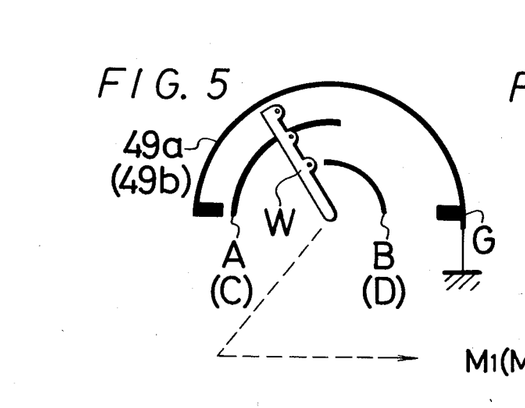
FIG. 5 is a schematic diagram showing position detecting switches for providing a detection signal representative of the position of the mechanism shown in FIGS. 1A and 1B.
Figure 6:
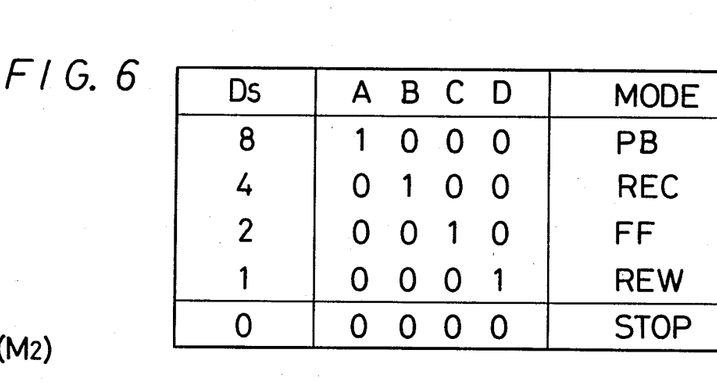

The position detector 49a and 49b replaces the contact members 13 and 29 and their associated contacts shown in FIGS. 1A and 1B. FIG. 5 illustrates schematically one embodiment of the position detecting switches 49a and 49b. An electrically conductive wiper W rotates with the motor $M_1$, as depicted schematically by dotted lines. In the switch 49a the wiper W slides along the contacts A and B. When the motor $M_1$ rotates in the forward direction (control signal $D_3=8$), the wiper W rotates counterclockwise as seen in FIG. 5. When the motor $M_1$ reaches an angular position that places the first mode changing means (FIG. 1A) in the PB mode, the wiper W establishes electrical contact between a contact A and a ground contact G. The digital bit A of the detection signal $D_S$ assumes a "1" level and $D_S=1000$ (or 8). As FIG. 6 shows, that value of $D_S$ indicates that the mode changing mechanism is in a position corresponding to the PB mode of the tape recorder. The switch 49b is associated with the motor $M_2$ and also has a wiper W and a ground contact G. In the switch 49b the contacts C and D correspond to the contacts A and B of the detector 49a. As is apparent from FIGS. 5 and 6, when the motors $M_1$ and $M_2$ are in their neutral positions (that is, as shown in FIGS. 1A and 1B), the respective digital bits A, B, C and D are "0".

The detection signal $D_S$ from the position detector is provided to the comparator 48. The comparison signal $D_4$ generated by the ROM 46 is also provided to the comparator 48. The comparator 48 generates a match signal, which is fed to the loading latch circut 50, when the detection signal $D_S$ and the comparison signal $D_4$ coincide. To facilitate the comparison of the detection signal $D_S$ and the comparison signal $D_4$, they are both provided in the same four-bit digital form. Thus the ROM 46 provides the comparison signal $D_4$ as four digital bits A', B', C' and D', which represent the particular position to which the mode changing mechanism is moving as a result of the control signal $D_3$, and the position detector provides the four digital bits A, B, C and D, which indicate that the mode changing mechanism is in that particular position.

Referring again to FIG. 2, the loading latch circuit 50 is supplied with the particular mode signal $D_5$ generated by the memory circuit 46. The loading latch circuit 50 holds the particular mode signal $D_5$ until it receives a match signal from the comparator 48. The loading latch circuit 50 then acts as a loading means to provide the particular mode signal $D_5$ to the memory circuit 46 as the present mode signal $D_2$.

A reset circuit 51 is powered when the tape recorder power switch is actuated to reset the loading latch circuit 50 to $D_2=0$ (digit 000), thus indicating that the recorder is in the STOP mode.

Figure 3:
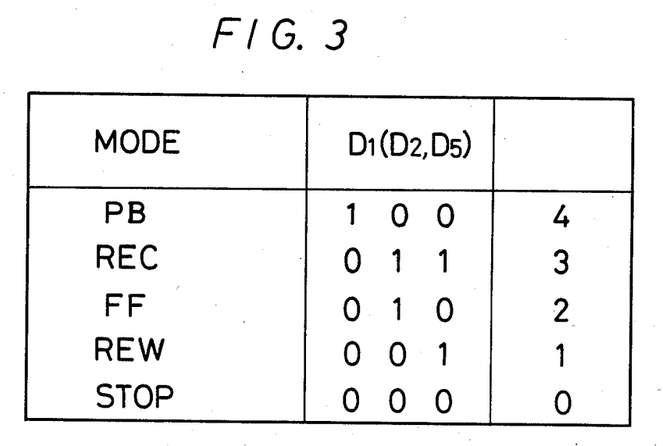
FIGS. 3, 4 and 6 are tables indicating the digital signals generated by the system shown in FIG. 2.

The operation of the position control system of this embodiment of the present invention will be described with reference particularly to the tables in FIGS. 3 and 7.

An operator depresses any one of the mode setting buttons 41a to 41e depending on the desired mode of operation of the tape recorder. The depressed button connects a power source through a resistor r to ground and thus provides a falling pulse (or digital "0") through the OR circuit 42 to the differentiating circuit 43. The differentiating circuit 43 provides a falling pulse to the specifying latch circuit 44 to clear it. The signal derived from the depressed mode setting button is also supplied directly to the specifying latch circuit 44 and is held therein. When this signal held is, for example, generated by depressing the PB mode button 41a, the encoder 45 generates a specified mode signal $D_1=100$ (4) and supplies it to the memory circuit 46. The values of $D_1$ corresponding to the different modes of operation of the tape recorder are shown in FIG. 3.

Figure 7:
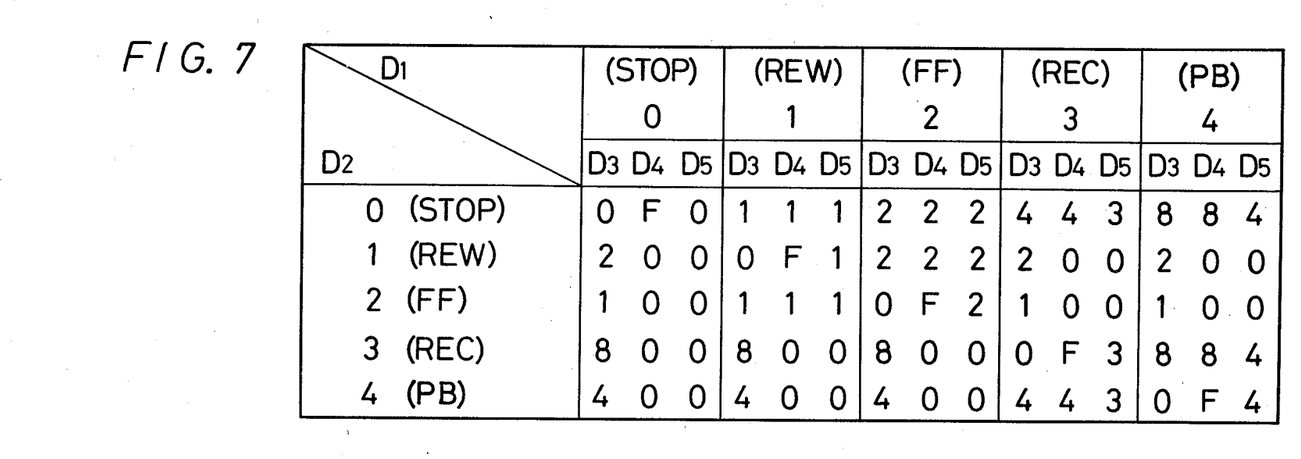
FIG. 7 is a table indicating the programming of the ROM shown in FIG. 2.

The table in FIG. 7 indicates in hexadecimal notation the data stored in the memory circuit 46 as a function of the specified mode signal $D_1$ provided from the encoder 45 as one address signal and the present mode signal $D_2$, representative of the position presently occupied by the mode changing mechanism, as the other address signal. As FIG. 3 shows, the values of $D_2$ correspond to those of $D_1$ for respective operating modes of the tape recorder.

As one illustration of the operation of the present invention, assume that the tape recorder is in the STOP mode. In that case, both mode changing means are in the non-operative positions shown in FIG. 1A and 1B. The present mode signal $D_2$ is 0 (000) and is stored in the memory circuit 46 as one address signal. Assume further that button 41a has been depressed so that the specified mode is the PB mode and the specified mode signal $D_1$ becomes 4 (100). Thus, the memory circuit 46 is accessed by a present mode signal $D_2$ of 0 and a specified mode signal $D_1$ of 4. As shown in FIG. 7, the ROM 46, when so addressed, produces a control signal $D_3$ of 8 (1000), a comparison signal $D_4$ of 8 (1000) and a particular mode signal $D_5$ of 4 (100). FIGS. 3 and 6 show that the comparison signal $D_4$ and the particular position signal $D_5$ both represent the mode, or position, to which the control signal $D_3$ will move the mode changing mechanism.

More particularly, the control signal $D_3=8$ (1000) is supplied to the motor drive circuit 47 and rotates the motor $M_1$ in the forward direction, as shown in FIG. 4. The forward rotation of the motor $M_1$ moves the first mode control means shown in FIG. 1A to the PB mode. The detection signal $D_S=8$ (1000) is generated by the position detecting switches 49a and 49b when the motor $M_1$ reaches its forward angular position, thus placing the first mode control means in the specified position. At that point the detection signal $D_S=8$ coincides with the comparision signal $D_4=8$ (1000) generated by the memory circuit 46. Then, the match signal from the comparator 48 causes the particular position signal $D_5$ (100), which is indicative of the PB mode and which was supplied to and held in the loading latch circuit 50 when the ROM 46 generated it, to be supplied to the ROM 46 as the present mode signal $D_2$. (In this example, the motor $M_2$ does not rotate and hence the outputs from the position detecting switch 49b are C=0 and D=0.)

Then, the memory circuit 46 is addressed by the specified mode signal $D_1$, which is still 100 (or 4) and which is indicative of the PB mode, and the new present mode signal $D_2$, which is now also 100 (or 4). Thus, the present mode signal $D_2$ is indicative of the PB mode which is the desired, or specified, mode. As shown in FIG. 7, the ROM 46 is programmed then to provide $D_3$, $D_4$ and $D_5$ as 0, F and 4, respectively. The control signal $D_3$ of 0 stops the rotation of both of the motors $M_1$ and $M_2$, as shown in FIG. 4. The comparison signal $D_4$ assumes the value 1111 ("F"). Thus, the detection signal $D_S$ generated by the position detectors can never match the comparison signal $D_4$. The comparator 48 thus cannot produce a match signal and the operation of the position control system is ended at that time with the tape recorder in the PB mode.

Now assume that the mode of operation of the tape recorder is to be changed from the PB mode to the REW mode.

The present mode signal $D_2$ is 4 (100) when the mode of operation is the PB mode. The mode selecting button 41d is depressed and the encoder 45 provides a specified mode signal $D_1$ of 001 (1) to the memory circuit 46 (see FIG. 3). The memory circuit 46 generates the signals $D_3$, $D_4$, $D_5$ as 4, 0, 0, respectively, as shown in FIG. 7. Since the control signal $D_3$ is 4, the motor $M_1$ is rotated in the reverse direction, as shown in FIG. 4. The comparison signal $D_4$ of 0 is supplied to the comparator 48. When the motor $M_1$ rotates in the reverse direction, the first mode changing means shown in FIG. 1A is returned from the PB mode to the non-operative position. When it reaches the non-operative position, the position detector provides the detection signal $D_S$ as 0 and the comparator 48 generates the match signal.

The particular mode signal $D_5$ of 0 being held in the latch circuit 50 is then loaded into the ROM 46 as the present mode signal $D_2$.

As shown in FIG. 7, when $D_1$ is 1 and $D_2$ is 0, $D_3$, $D_4$ and $D_5$ are provided as 1, 1 and 1, respectively, by the memory circuit 46. The control signal $D_3$ of 1 starts the motor $M_2$ rotating in the reverse direction, while the particular mode signal $D_5$ of 1 is provided to the loading latch circuit 50. When the motor $M_2$ reaches the angular position corresponding to the REW mode, the position detecting switches 49a and 49b provide the detection signal $D_S$ as 0001 (see FIG. 6). The comparator 48 thus provides the match signal (since $D_4=D_S=0001=1$) and the particular mode signal $D_5=1$ is loaded into the ROM 46 as the present mode signal $D_2$.

Thus, $D_1=D_2=1$ and the memory circuit 46 generates $D_3$, $D_4$, and $D_5$ as 0, F and 1, respectively. Since the control signal $D_3$ is 0, the motors $M_1$ and $M_2$ are stopped. The comparison signal $D_4$ becomes F to prevent the comparator 48 from producing a match signal. The tape recorder is in the REW mode.

The present invention can be used with a one- or two-motor mode changing mechanism by appropriately re-programming the ROM 46. The present invention also permits conversion between particular modes to be easily prevented. For example, suppose it is desired to make it impossible to convert from the PB mode directly to the REC mode. In the above-described embodiment, as shown in Fig. 7, if the tape recorder is in the PB mode ($D_2=4$) and the REC mode is specified ($D_1=3$), the ROM 46 will provide $D_3$, $D_4$ and $D_5$ as 4, 4 and 3, respectively. However, if the ROM is programmed instead to provide $D_3$, $D_4$ and $D_5$ as 0, F and 4, resepectively, the motors $M_1$ and $M_2$ will be prevented from rotating and the specified mode conversion will be prevented.

It is also possible to program the ROM 46 to control both the motors $M_1$ and $M_2$ simultaneously and to perform the mode conversion of the two mode changing mechanism in one step. In that case the data stored in the ROM 46 would be rewritten so that the particular mode signal $D_5$ coincides with the specified mode signal $D_1$ within one control cycle.

While in the above illustrative embodiment a position control system was described for controlling the mode changing mechanism of a tape recorder, the position control system according to the present invention can be used to control other apparatus.

As set forth above, since the position control system according to the present invention can be used to control various apparatus by using a single memory circuit as its main circuit, it can be manufactured using standarized integrated circuits, thus enabling mass-production and improving reliability. Since the memory circuit requires only low voltages and therefore has low power requirements, the position control system according to this invention is particularly suitable for use with a mode changing mechanism of a compact, portable, battery-powered tape recorder. Further, by modifying only the memory circuit, the position control system according to this invention can be applied to various tape recorder embodiments.

From the above detailed description of a single embodiment of the invention, it will be apparent to those having ordinary skill in the art that many modifications and variations other than those specifically pointed out are possible without departing from the spirit or scope of the invention. It should also be clear that directional terms like "upward" and "clockwise" were used in this description only for the sake of convenience and not to limit the invention to any particular orientation. In short, the scope of the invention is defined not by the above detailed description of an illustrative embodiment but solely by the claims which follow.

What is claimed is:

1. A position control system for a mechanism capable of being placed by a drive means in any one of a plurality of specified positions, comprising:

specifying means for providing a specified position signal having a value representative of a specified position to be occupied by the mechanism;

loading means for providing a present position signal having a value representative of the position presently occupied by the mechanism;

memory means for receiving said specified and present position signals and generating in response thereto a control signal for controlling the drive means for moving the mechanism into a particular position and a comparison signal and a particular position signal having respective values representative of said particular position;

a position detector for providing a detection signal having a predetermined value when the mechanism is in said particular position; and comparing means for providing a match signal to said loading means when the values of said detection signal and said comparison signal have a predetermined relation, wherein said loading means provides said particular position signal to said memory means as said present position signal in response to said match signal and said control signal de-energizes the drive means when the values of said present position signal and said specified position signal have a predetermined relation.

2. A position control system as in claim 1; wherein:
said specified position signal, said present position signal, said control signal, said comparison signal, said particular position signal and said detection signal comprise digital data;
said detection signal coincides with said comparison signal when the mechanism is in said particular position;
said comparing means provides said match signal when said detection signal and said comparison signal coincide; and
said control signal de-energizes the drive means when said present position signal coincides with said specified position signal.

3. A position control system as in claim 2; wherein said specifying means comprises a plurality of selectively actuable switches each representing a respective one of said specified positions.

4. A position control system as in claim 3; wherein each said switch, when actuated, provides a switch pulse corresponding to a specified position of the mechanism and said specifying means further comprises:
a specifying latch circuit for receiving a plurality of said switch pulses and providing a single predetermined one of said received pulses; and
an encoding means for receiving said single pulse and generating said specified position signal representative of the position corresponding to said single pulse.

5. A position control system as in claim 4; wherein said specifying means further comprises a differentiating means for receiving said switch pulses and clearing said latch circuit in response thereto.

6. A position control system as in claim 2; wherein said memory means comprises a read-only memory.

7. A position control system as in claim 6; wherein said memory means provides said comparison signal in a form impossible of coinciding with said detection signal when said present position signal and specified position signal coincide.

8. A position control system as in claim 2; further comprising a motor as the drive means, wherein said control signal provides selective forward and reverse rotation and de-energization of said motor for moving the mechanism into respective specified positions.

9. A position control system as in claim 8; wherein said position detector detects the angular position of the shaft of said motor.

10. A position control system as in claim 9; wherein said position detector comprises an electrically conductive wiper secured to the shaft of said motor for rotation therewith and a plurality of electrically conductive contacts selectively engaged by said wiper for generating digital bits representative of respective positions of the mechanism.

11. A position control systen as in claim 2; wherein said loading means comprises a loading latch circuit for receiving and holding the value of said particular position signal and supplying said held value of said particular position signal to said memory means in response to said match signal.

12. A mode changing mechanism for a tape recording and reproducing apparatus capable of occupying any one of a plurality of specified operating modes corresponding to respective positions of the mechanism, comprising:
specifying means for providing a digital specified mode signal representative of a specified mode of operation to be occupied by the apparatus;
loading means for providing a digital present mode signal representative of the mode of operation presently occupied by the apparatus,
memory means for receiving said specified mode signal and said present mode signal and providing in response thereto a digital control signal for controlling a drive means for moving the mechanism into a particular position corresponding to a respective mode of operation of the apparatus, a digital comparison signal representative of said particular position and a digital particular mode signal representative of the mode of the apparatus corresponding to said particular position of the mechanism;
a position detector for providing a digital detection signal that coincides with said comparison signal when the mechanism is in said particular position; and
comparing means for providing a match signal to said loading means when said detection signal and said comparison signal coincide, wherein said loading means provides said particular mode signal to said memory means as said present mode signal in response to said match signal and said control signal de-energizes the drive means when said present mode signal and said specified mode signal coincide.

13. A mode changing mechanism as in claim 12; further comprising first and second motors as the drive means, wherein said control signal provides selective forward and reverse rotation of said motors.

14. A mode changing mechanism as in claim 13; wherein the modes of operation of the apparatus and the respective positions of the mechanism correspond to respective forward, reverse and neutral angular positions of said motors.

15. A mode changing mechanism as in claim 14; wherein said position detector senses said angular positions of said motors and said detection signal assumes respective values corresponding thereto.

16. A tape recording and reproducing apparatus having a mode changing mechanism capable of occupying a plurality of positions corresponding to respective specified modes of operation of the apparatus, comprising:
a first mode changing means capable of occupying two operating positions corresponding respectively to first and second modes of operation of the apparatus and a non-operative position;
a second mode changing means capable of occupying two operating positions corresponding respectively to third and fourth modes of operation of the apparatus and a non-operative position;
a first motor for operating said first mode changing means, said first motor being capable of rotation from a neutral position, corresponding to said non-operative position of said first mode changing means, in forward and reverse directions for moving said first mode changing means to respective said operating positions;
a second motor for operating said mode changing means, said second motor being capable of rotation from a neutral position, corresponding to said non-operaive position of said second mode changing means, in forward and reverse directions for moving said second mode changing means to respective said operating positions;

specifying means for providing a digital specified mode signal representative of a specified mode of operation to be occupied by the apparatus;

loading means for providing a digital present mode signal representative of the mode of operation presently occupied by the apparatus;

memory means for receiving said specified mode signal and said present mode signal and providing in response thereto a digital control signal for rotating at least one of said motors to move said respective mode changing means toward a particular said position thereof, a digital comparison signal representative of said particular position and a digital particular mode signal representative of the mode of operation of the apparatus corresponding to said particular position;

a position detector for providing a digital detection signal that coincides with said comparison signal when the mechanism is in said particular position; and comparing means for providing a match signal to said loading means when said detection signal and said comparison signal coincide, wherein said loading means provides said particular mode signal to said memory means as said present mode signal in response to said match signal and said control signal de-energizes said motors when said present mode signal and said specified mode signal coincide.

17. A tape recording and reproducing apparatus as in claim 16; wherein:

rotation of said first motor predetermined amounts in said forward and reverse directions while said second motor is in said neutral position establishes said first and second modes of operation, respectively;

rotation of said second motor predetermined amounts in said forward and reverse directions while said first motor is in said said neutral position establishes said third and fourth modes of operation, respectively; and said position detector detects the rotation by said motors of said predetermined amounts and the position of said motors in said neutral positions and provides said detection signal to represent said positions of said motors.

18. A tape recording and reproducing apparatus as in claim 17; wherein said position detector comprises first and second position switches for providing said detection signal.

19. A tape recording and reproducing apparatus as in claim 18; wherein:

said first mode of operation is a playback mode in which said first mode changing means places a magnetic reproducing head and a pinch roller in contact with a magnetic tape;

said second mode of operation is a recording mode in which said first mode changing means places a magnetic recording head, an erase head and a pinch roller in contact with a magnetic tape;

said third mode of operation is a fast forward mode in which said second mode changing means places a tape drive motor into driving relation with a tape take-up reel to drive it at a relatively increased rate;

said fourth mode of operation is a rewind mode in which said second mode changing means places a tape drive motor into driving relation with a tape supply reel to drive it at a relatively increased rate; and said non-operative positions of said first and second mode changing means correspond to a non-operating mode of the apparatus.

20. A tape recording and reproducing apparatus as in claim 19; wherein said specifying means comprises a plurality of mode setting buttons for actuating respective switches to provide a mode specifying signal having a value representative of respective modes of operation of the apparatus.

* * * * *